(12) United States Patent
Somerville et al.

(10) Patent No.: US 8,500,367 B2
(45) Date of Patent: Aug. 6, 2013

(54) SUPPRESSION OF VORTEX INDUCED VIBRATION

(75) Inventors: David Michael Ruthven Somerville, Wigan (GB); Nicholas W. Byrne, Manchester (GB)

(73) Assignee: Trelleborg CRP Limited, Skelmersdale, Lancashire (GB)

( * ) Notice: Subject to any disclaimer, the term of this patent is extended or adjusted under 35 U.S.C. 154(b) by 425 days.

(21) Appl. No.: 12/523,515

(22) PCT Filed: Oct. 15, 2007

(86) PCT No.: PCT/GB2007/050635
§ 371 (c)(1),
(2), (4) Date: Jan. 12, 2010

(87) PCT Pub. No.: WO2008/087372
PCT Pub. Date: Jul. 24, 2008

(65) Prior Publication Data
US 2010/0119308 A1     May 13, 2010

(30) Foreign Application Priority Data

Jan. 17, 2007 (GB) .................................. 0700872.5
Apr. 26, 2007 (GB) .................................. 0708108.6

(51) Int. Cl.
*F15D 1/10*     (2006.01)
(52) U.S. Cl.
USPC .......................................... 405/216; 405/211
(58) Field of Classification Search
USPC ................... 405/211, 211.1, 216, 223.1, 224, 405/224.2, 224.3, 224.4; 114/243
See application file for complete search history.

(56) References Cited

U.S. PATENT DOCUMENTS

| 4,078,605 A | 3/1978 | Jones |
| 4,171,674 A | 10/1979 | Hale |

(Continued)

FOREIGN PATENT DOCUMENTS

| EP | 1 310 630 A1 | 5/2003 |
| GB | 2 335 248 A | 9/1999 |

(Continued)

OTHER PUBLICATIONS

Patents Act 1977: Search Report under Section 17 for United Kingdom Counterpart Application No. GB0700872.5, 3 pgs., (May 10, 2007).

(Continued)

*Primary Examiner* — Frederick L Lagman
(74) *Attorney, Agent, or Firm* — Blakely, Sokoloff, Taylor & Zafman LLP

(57) ABSTRACT

A device and method are disclosed for suppressing vortex induced vibration of a submerged elongate member such as a marine riser. Also disclosed is a marine riser having VIV suppression features. The VIV suppression features comprise multiple circumferential de-correlation rings at intervals along the member's length, each ring comprising multiple vortex tripping features at intervals around the member. The ring may for example take the form of a clamp (10) used to locate fairing units (108). However it may alternatively be a loose ring mounted on the member, or may comprise discrete features at intervals around the circumference of the member. By reducing correlation between shed vortices at different locations on the pipe, embodiments of the invention serve to prevent or reduce the coherent action of shed vortices which lead to VIV.

38 Claims, 3 Drawing Sheets

U.S. PATENT DOCUMENTS

| | | | |
|---|---|---|---|
| 4,398,487 A * | 8/1983 | Ortloff et al. | 114/243 |
| 4,474,129 A | 10/1984 | Watkins et al. | |
| 5,410,979 A * | 5/1995 | Allen et al. | 114/243 |
| 5,722,340 A * | 3/1998 | Sweetman | 405/211 |
| 6,010,278 A * | 1/2000 | Denison et al. | 405/216 |
| 6,048,136 A * | 4/2000 | Denison et al. | 405/211 |
| 6,067,922 A | 5/2000 | Denison et al. | |
| 6,179,524 B1 * | 1/2001 | Allen et al. | 405/211 |
| 6,223,672 B1 * | 5/2001 | Allen et al. | 405/211 |
| 6,561,734 B1 * | 5/2003 | Allen et al. | 405/216 |
| 6,644,894 B2 * | 11/2003 | Shu et al. | 405/211 |
| 6,685,394 B1 * | 2/2004 | Allen et al. | 405/211 |
| 6,755,595 B2 * | 6/2004 | Oram | 405/216 |
| 7,070,361 B2 * | 7/2006 | McMillan et al. | 405/211 |
| 7,337,742 B1 * | 3/2008 | Masters et al. | 114/243 |
| 2003/0007839 A1 * | 1/2003 | Brown | 405/211 |
| 2004/0013473 A1 * | 1/2004 | Gibson | 405/211 |
| 2004/0258485 A1 * | 12/2004 | Steinkamp et al. | 405/211 |
| 2006/0021560 A1 * | 2/2006 | McMillan et al. | 114/221 R |
| 2006/0115335 A1 * | 6/2006 | Allen et al. | 405/274 |
| 2006/0153642 A1 * | 7/2006 | Esselbrugge et al. | 405/216 |
| 2006/0231008 A1 * | 10/2006 | Allen et al. | 114/243 |
| 2006/0280559 A1 * | 12/2006 | Allen et al. | 405/216 |
| 2007/0196181 A1 * | 8/2007 | Tyrer et al. | 405/224.2 |
| 2007/0215028 A1 * | 9/2007 | Lie | 405/211 |
| 2007/0231077 A1 * | 10/2007 | Burgess | 405/216 |
| 2008/0050181 A1 * | 2/2008 | Masters et al. | 405/211 |

FOREIGN PATENT DOCUMENTS

| | | |
|---|---|---|
| GB | 2 378 969 A | 2/2003 |
| GB | 2421751 A | 7/2006 |
| GB | 2 441 534 A | 3/2008 |
| WO | WO 99/05389 | 2/1999 |
| WO | WO 01/19669 A1 | 3/2001 |
| WO | WO 02/18709 A1 | 3/2002 |
| WO | WO 02/072995 A1 | 9/2002 |
| WO | WO 2005/026560 A1 | 3/2005 |

OTHER PUBLICATIONS

PCT/GB2007/050635, International Search Report, Date of Mailing Feb. 28, 2008, 4 pages.

PCT/GB2007/050635, Written Opinion of the International Searching Authority, Dated Jul. 17, 2009, 8 pages.

* cited by examiner

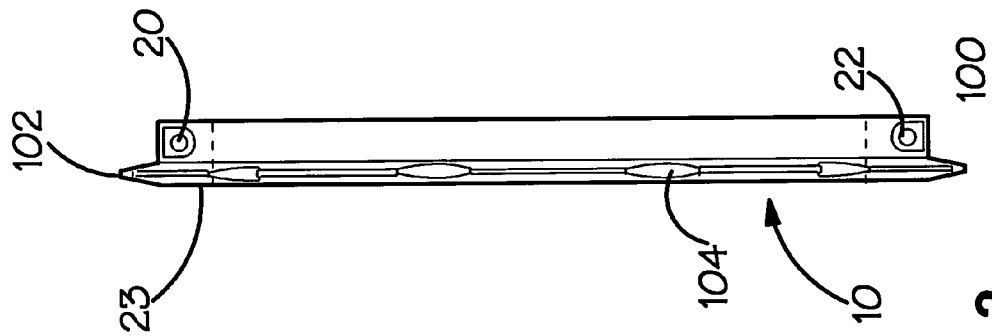
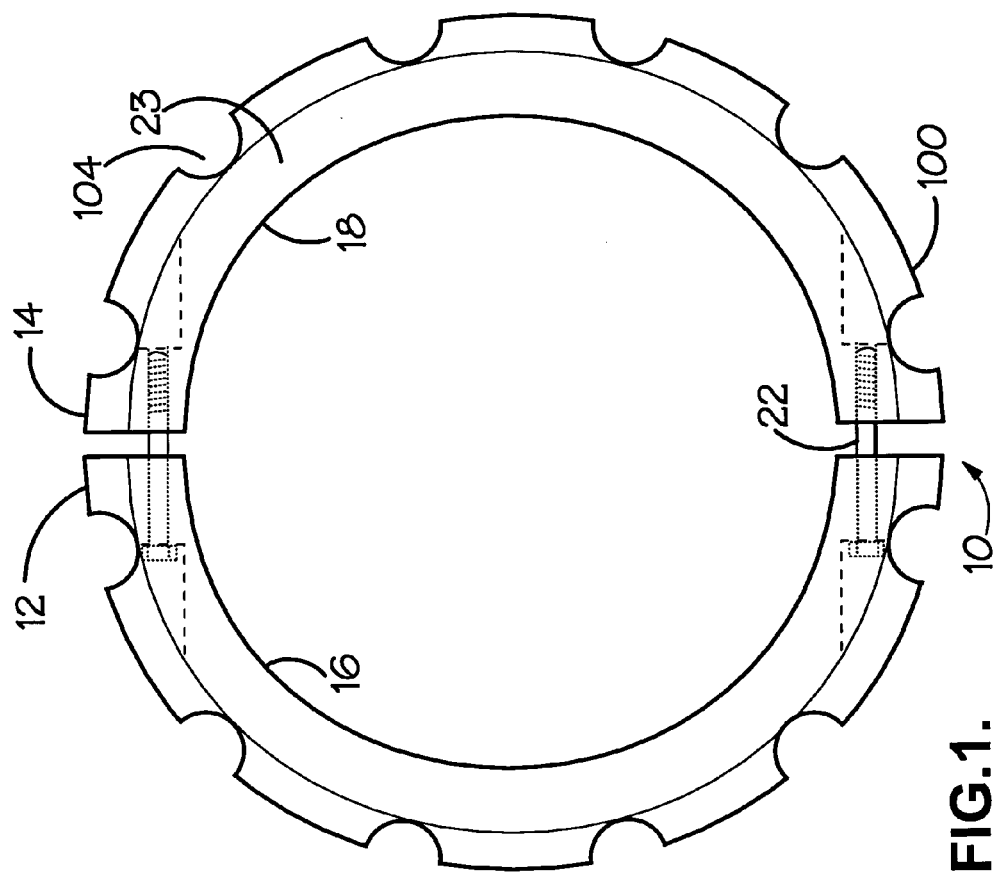

SUPPRESSION OF VORTEX INDUCED VIBRATION

CROSS-REFERENCE TO RELATED APPLICATIONS

This patent application is a U.S. National Phase application under 35 U.S.C. §371 of International Application No. PCT/GB2007/050635, filed on Oct. 15, 2007, entitled SUPPRESSION OF VORTEX INDUCED VIBRATION, which claims priority to Great Britain patent application number 0700872.5, filed on Jan. 17, 2007 and Great Britain patent application number 0708108.6 filed on 26 Apr. 2007.

FIELD

The present invention relates to suppression of vortex induced vibration of an elongate underwater member such as a marine riser.

BACKGROUND

The present invention is applicable, in particular, in connection with marine risers used in offshore oil extraction, although it has potential applications in other situations in which a submersed, elongate (and typically cylindrical) member is exposed to water flow and must be protected from the effects thereof. Therefore although risers will be referred to in the following discussion, the member in question may take other forms—it may for example be a pipe, drilling riser or indeed it may be a buoyancy unit, e.g. a unit attached to a marine user.

Water currents impinging on marine risers can create both vortex induced vibration and drag.

Vortices form in the flow downstream of the riser and are intermittently "shed"—that is, they detach themselves from the riser and move downstream with the flow. Vortices shed from one side or other of the riser create a force upon it in a corresponding direction, generally across the direction of fluid flow. It is found that in some cases this shedding of vortices can cause a low frequency vibration or oscillation of the riser. It is believed that while the shedding of vortices is incoherent along the length of the pipe, their net effect is relatively small. If vortices correlate along the pipe length to produce a coherent effect upon it then potentially damaging VIV can result. Motion of the pipe, for example periodic motion back and forth in a direction across the fluid flow, can promote vortex correlation and so exacerbate the problem. If VIV occurs at or near a natural frequency of which pipe oscillation; resonance effects can exacerbate the problem.

Drag is a force on the riser along the direction of the fluid flow. It produces undesirable bending stresses and potentially it also increases load at the riser's point of suspension.

It is known to address both problems by placing around the riser a streamlined, teardrop shaped fairing which is free to pivot about the riser's axis and so to "weathervane"—that is, to align itself with the direction of the current. Such a fairing is disclosed in the applicant's UK patent application 0603040.7 published under number GB 2421751 A. The fairing disclosed in that application is formed of multiple fairing sections placed side-by-side along the length of the riser. To locate the fairings and prevent them from moving along the riser, clamps are interposed at intervals between neighbouring fairings, the clamps being secured to the riser. Such fairing arrangements are found to be effective in suppressing VIV, although improvement of their performance remains desirable.

Another approach to suppression of VIV is to provide shaped features upon the riser which influence the transition, in the fluid flow over it, from smooth laminar flow to turbulent flow. A widely adopted arrangement of this type uses helical strakes extending along the riser's length and around its circumference. While effective in suppressing VIV, these strakes add constructional complexity, and can also increase drag as well as creating difficulties during deployment of the riser.

It has been observed in confidential trials that a fixed cylindrical pipe, exposed to a flow normal to its length, while shedding vortices as a result of the flow, is subjected to smaller oscillatory forces than an identical pipe supported in a manner that allows movement normal to the direction of flow.

This has been explained by reference to correlation of vortices along the length of the pipe. There is a "correlation length" beyond which—in the case of a fixed pipe—vortices do not correlate together, and so remain out of phase. Their effect on the pipe is therefore incoherent and any tendency toward VIV is thus reduced. Where the pipe is able to oscillate, its motion is thought to promote correlation, and the resultant coherent effect of the shed vortices further promotes VIV.

It has also been observed, in confidential trials conducted by the applicant, that in the type of arrangement described above comprising rotatable fairings separated by clamps, omission of the clamps from the arrangement can impair VIV suppression. It is believed that in this case vortices shed from the fairings along the length of the riser correlate, so that their action upon the riser is coherent. When the shedding frequency approaches the natural frequency of the riser, resonance can occur leading to deleterious effects. The presence of the clamps is believed to assist in reducing the correlation between vortices, so that their effect is less coherent and less likely to produce vibration.

SUMMARY

An object of the present invention is to enhance VIV suppression. It is desired to achieve this object in a manner which is constructionally simple and which does not add excessively to manufacturing cost.

In accordance with a first aspect of the present invention, there is apparatus for suppressing vortex induced vibration of an elongate member in a fluid flow, the apparatus comprising a plurality of fairing units each comprising a fairing body adapted to be mounted upon the elongate member such as to be able to rotate about it, independently of other fairing units, to align itself with the fluid flow, the apparatus further comprising at least one de-correlation device for mounting between neighbouring fairing bodies, the de-correlation device comprising a plurality of vortex tripping features positioned in use at intervals around the periphery of the elongate member.

Preferably the apparatus is mounted on an elongate member which is substantially circular in section, the vortex tripping features being at intervals around the member's circumference.

Preferably the de-correlation device comprises an upstanding vane which extends in use around the elongate member.

Preferably the vane is cut away at intervals to form the vortex tripping features.

Preferably the cut aways in the vane are trapezoidal or "U" shaped.

Preferably the depth of the cut aways is at least half of the height of the vane.

Preferably the vortex tripping features are formed by holes through the vane.

Preferably the vortex tripping features have surfaces which are helically inclined with respect to the elongate member.

Preferably the helix angle is 45 degrees or less to the member's longitudinal axis.

Preferably the vane has sides which are inclined at an angle between three and twenty five degrees to a plane normal to the longitudinal axis of the elongate member.

Preferably the de-correlation device comprises at least two vanes extending around the member.

Preferably the two vanes are separated by a distance between 0.1 D and 0.5 D, where D is a lateral dimension of the elongate member.

Preferably the vortex tripping features comprise upstanding studs, or comprise pits.

Preferably the vortex tripping features are formed upon a projecting ring.

Preferably the vortex tripping features comprise discrete vanes arranged at intervals around the member.

Preferably the vanes are helically inclined to the elongate member's longitudinal axis.

Preferably the angle of inclination of the vanes is in the range 45 to 85 degrees to the member's longitudinal axis.

Preferably the apparatus is substantially circular and the vortex tripping features have a radial height between 0.01 D and 0.25 D, where D is a lateral dimension of the elongate member.

Preferably the number of vortex tripping features of the de-correlation device is from two to seventy two inclusive.

Preferably the number of vortex tripping features of the de-correlation device is from three to twenty four inclusive.

Preferably the de-correlation device is substantially circular and the vortex tripping features comprise any of helical grooves, axial or helical holes or circumferential grooves.

Preferably multiple de-correlation devices are separated by not more than 2 D, where D is the maximum lateral dimension of the elongate member.

Preferably multiple de-correlation devices are separated by not more than 1.4 D, where D is the maximum lateral dimension of the member.

Preferably multiple de-correlation devices are separated by a distance in the range from 1 D to 1.4 D, where D is the maximum lateral dimension of the member.

Preferably the de-correlation devices are formed by a ring structure for mounting around the elongate member.

Preferably the de-correlation device is a clamp.

Preferably vanes defining the vortex tripping features are triangular or trapezoidal in shape.

Preferably the apparatus is mounted on an elongate member formed as a pipe, marine riser, buoyancy module or the like.

Preferably the vane is at least 0.03 D, where D is a lateral dimension of the elongate member.

In accordance with a second aspect of the present invention, there is a clamp for mounting upon an elongate underwater member, the clamp comprising at least one clamp shell and at least one tension device for drawing the clamp shell against the elongate member to secure it against movement there along, the clamp shell having end faces for bearing upon respective fairing units on either side of the clamp, and the clamp shell having shaped vortex tripping features at discrete intervals around its outer periphery.

Preferably the clamp is substantially circular in section, the vortex tripping features being at intervals around the member's circumference.

In accordance with a third aspect of the present invention, there is a vortex induced vibration suppression device for attachment to an elongate underwater member, the device comprising at least one ring member for mounting upon the elongate member, the ring member being provided with multiple vortex tripping features at intervals along its periphery.

Preferably the ring member has an upstanding vane which extends around the elongate member when the ring is mounted.

Preferably the vane is cut away at intervals to form the vortex tripping features.

Preferably the cut aways in the vane are trapezoidal or "U" shaped.

Preferably the depth of the cut aways is at least half of the height of the vane.

Preferably the vortex tripping features are formed by holes through the vane.

Preferably the vortex tripping features have surfaces which are helically inclined with respect to the elongate member.

Preferably the helix angle is 45 degrees or less to the member's longitudinal axis.

Preferably the vane has sides which are inclined at an angle between three and twenty five degrees to a plane normal to the longitudinal axis of the elongate member.

Preferably the device comprises at least two vanes extending around the member.

Preferably the two vanes are separated by a distance between 0.1 D and 0.5 D, where D is a lateral dimension of the elongate member.

Preferably the vortex tripping features comprise upstanding studs, or comprise pits.

Preferably the vortex tripping features comprise discrete vanes arranged at intervals around the member in use.

Preferably the vanes are helically inclined to the elongate member's longitudinal axis.

Preferably the angle of inclination of the vanes is in the range 45 to 85 degrees to the member's longitudinal axis.

Preferably the device is substantially circular and the vortex tripping features have a radial height between 0.01 D and 0.25 D, where D is a lateral dimension of the elongate member.

Preferably the number of vortex tripping features per de-correlation ring is from two to seventy two inclusive.

Preferably the number of vortex tripping features per de-correlation ring is from three to twenty four inclusive.

Preferably the device which is substantially circular and the vortex tripping features comprise any of helical grooves, axial or helical holes or circumferential grooves.

Preferably the device is a clamp for locating fairings upon the elongate member.

Preferably parts forming the vortex tripping features comprise elastomer and are attached to the ring member.

In accordance with a fourth aspect of the present invention there is a method of suppressing vortex induced vibration of an elongate member deployed underwater, the method comprising providing the elongate member with VIV suppression features comprising multiple de-correlation devices at intervals along the member's length, each de-correlation device comprising multiple vortex tripping features at intervals around the member, thereby disrupting correlation of shed vortices along the elongate member.

In accordance with a fifth aspect of the present invention, there is an elongate member for underwater deployment provided with VIV suppression features comprising multiple circumferential de-correlation rings at intervals along the members length, each ring comprising multiple vortex tripping features at intervals around the member.

The de-correlation rings may have any of the features of shape or proportion of the de-correlation device mentioned above.

BRIEF DESCRIPTION OF THE DRAWINGS

Specific embodiments of the present invention will now be described, by way of example only, with reference to the accompanying drawings, in which:

FIG. 1 illustrates a clamp according to the present invention, viewed along an axial direction;

FIG. 2 illustrates the same clamp, viewed along a radial direction;

DETAILED DESCRIPTION

Figure 3:
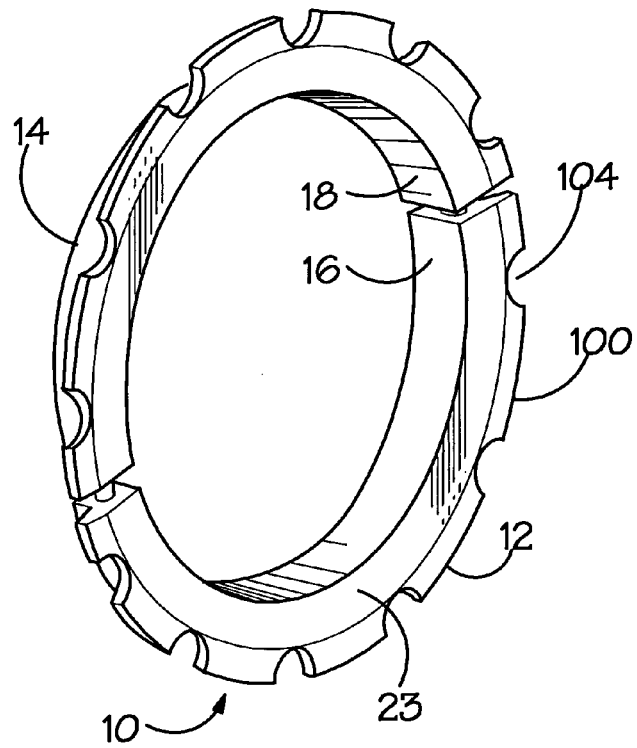
FIG. 3 is a perspective illustration of the clamp.

The embodiment of the present invention illustrated in FIGS. 1-4 comprises a clamp 10 for locating fairing units upon a marine riser used in oil extraction. It comprises two generally semi-annular clamp shells 12, 14 whose concave, semi-circular inner faces 16, 18 seat upon the riser in use. The clamp shells 12, 14 are to be assembled around the riser and secured to one another by means of bolts 20, 22 received in bores in respective end portions of the clamp shells. Tightening the bolts 20, 22 draws the clamp shells 12, 14 toward one another so that they grip upon the riser and can resist movement along it. Other clamps embodying the invention may use more than two clamp shells, and in principle a single flexible clamp shell could be used.

The material of the clamp—particularly its flexibility—and the number of clamp shells used determine the clamp's range of tolerance in the diameter of the member to which it is fitted. These properties may be chosen so that one clamp can be fitted to members having a range of different diameters.

The two end faces of the clamp, formed by the clamp shells 12, 14 and one of which is indicated at 23, are flat and serve as bearing surfaces against which run the rotatable fairing sections.

While the clamp requires some form of tension device to draw its shells against the riser, this need not necessarily take the form of bolts. It could, for example, use a band drawn tightly around the clamp shells.

The clamp 10 serves the following functions:
 i. it axially locates the fairings, while allowing them to rotate around the riser,
 ii. it provides bearing surfaces 23 for the rotatable fairings,
 iii. it provides a change in diameter, which assists to reduce correlation of vortices between fairing sections, and
 iv. in accordance with the invention, it carries features which assist in further breaking down the correlation of shed vortices.

The last of these aspects will now be considered.

In accordance with the invention, the clamp incorporates a circumferential vane 100, protruding radially from the outer surfaces of the clamp shells 12, 14. In the present embodiment the vane has a triangular section with a blend radius at its tip, seen at 102 in FIG. 2. It also has cut-aways or grooves 104 at intervals around its circumference. The grooves 104 serve to trip flow—i.e. to promote a change from laminar to turbulent flow—in the fluid moving past the assembly. In this way correlation between vortices shed from fairing sections on either side of the clamp is reduced.

The features of the clamp which serve this function need not necessarily comprise a vane as such, and may in fact take any number of different forms, including the following:
 1. more than one vane
 2. radial studs
 3. radial pits
 4. an elevated ring outside the clamp
 5. raised features to change the clamp from a circular profile to a non-uniform profile.

The height of the vane or other features may range from 0.01 D to 0.25 D, where D is the hydrodynamic diameter of the fairing or pipe, whichever is the larger. More specifically, it may range from 0.05 to 0.2 D or 0.05 to 0.15 D. Where discrete features are used at intervals around the circumference, they may lie in a common plane perpendicular to the pipe's axis or they may be at different axial positions on the clamp. Where a vane is used it may, as alternatives to the triangular section illustrated, have a rectangular, trapezoidal or semi-circular profile. The profile need not be symmetrical in shape. In place of the cut-aways used in the illustrated embodiment, helical grooves, axial or helical holes or circumferential grooves may be used. The cut-aways of the illustrated embodiment have a "u" profile, but rectangular, triangular or trapezoidal grooves may instead be provided.

The number of flow-tripping features placed around the circumference—such as the grooves, holes, studs, etc—may be from a minimum of two per clamp to perhaps 72 per clamp. In the illustrated embodiment there are 12 cut-aways 104.

Figure 4:
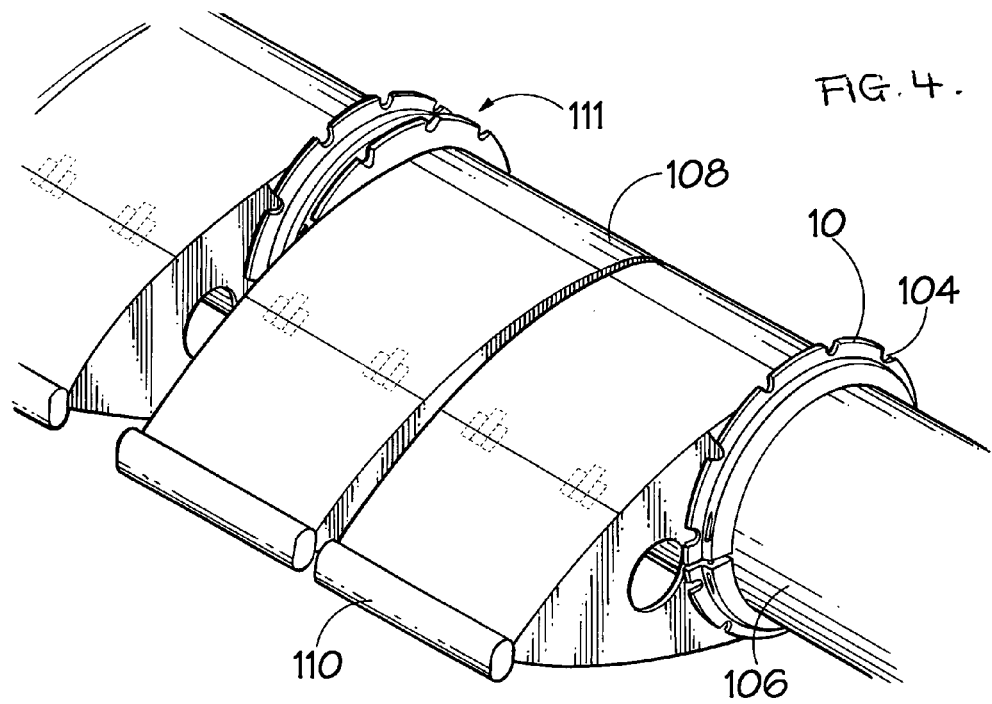
FIG. 4 is a perspective illustration of an assembly according to the present invention, comprising the aforementioned clamp, a number of fairing units and a marine riser.
Figure 5:
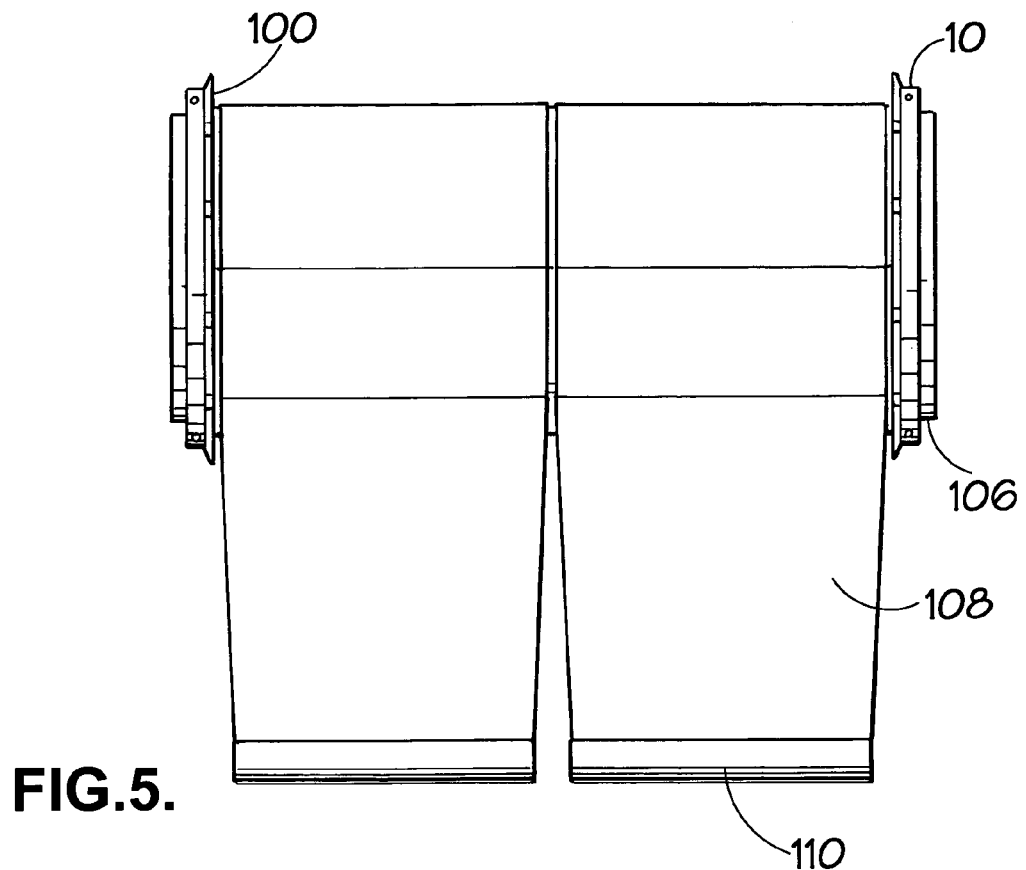
FIGS. 5 and 6 illustrate the same assembly, viewed along different radial directions.
Figure 6:
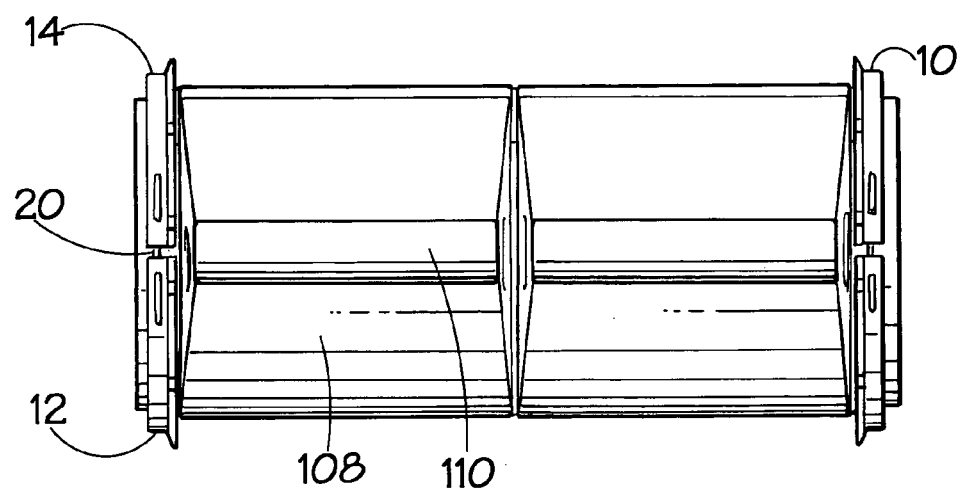

FIGS. 4, 5 and 6 show the clamp in use. A cylindrical marine riser is seen at 106 and upon it are mounted numerous individual fairing units 108. The riser passes through the fairing units which are free to rotate about it, independently of one another, in order to align themselves with water flow past the riser, e.g. due to tidal currents. The fairing units 108 have a teardrop shape and an enlarged duck tail 110, and their presence can both reduce drag and alleviate VIV. Clamps 10 according to the present invention are placed at intervals between the fairing units to locate them and resist movement along the riser 106.

In the illustrated arrangement two back to back clamps are shown, at 111, between a pair of fairing units. This is not always necessary. The clamps 10 may instead be arranged singly.

The illustrated clamp serves to de-correlate shedding of vortices between neighbouring fairing units and in this way to reduce any tendency for shed vortices to exert a coherent force upon the riser of a type which would cause oscillatory behaviour.

The combination of rings of de-correlation features at discrete intervals along the length of the riser, and the fairing units, is believed to be particularly effective in suppressing VIV. However, the de-correlation effect provided by the above described features of the clamp is also believed to be potentially effective in suppressing VIV even in the absence of fairing units. By causing the correlation of vortices being shed along the length of the riser to be limited to discrete lengths, even an arrangement lacking the fairing units can suppress VIV. Typically the acceptable correlation length for a bare elongate member such as a riser is between 1 and 1.4 times the hydrodynamic diameter. As such, de-correlation rings would preferably be fitted to a bare cylinder at intervals of less than twice the diameter, and most preferably between 1 and 1.4 times the diameter. The de-correlation rings could in fact be formed identically to the clamp described above. Alternatively however, a less robust construction could of course be used where the de-correlation rings are not required to support axial loads. The rings of de-correlation features could in practice be integrally formed with or loosely attached to the marine riser or other elongate member.

Numerous variations upon the actual construction illustrated herein will present themselves to the skilled person and could be adopted in implementing the present invention. For example, in the case in which the de-correlation rings are used in conjunction with rotatable fairings, the rings could in some cases be formed by loose collars rather than clamps as such. The vanes or other upstanding members forming the features used to trip flow could be formed of elastomeric material attached to shells forming the ring. In this way, they would be rendered less vulnerable to damage e.g. during deployment.

What is claimed is:

1. An elongated member for underwater deployment provided with vortex induced vibration (VIV) suppression features comprising multiple circumferential de-correlation rings at intervals along the elongated member's length, each de-correlation ring comprising a plurality of vortex tripping features positioned at intervals around the periphery of the elongated member, the de-correlation rings being separated by a distance in the range from 1 D to 2 D, where D is a lateral dimension of the elongated member, and no fairings being provided between the de-correlation rings.

2. The elongated member as claimed in claim 1 which is substantially circular in section, the vortex tripping features being at intervals around the member's circumference.

3. The elongated member as claimed in claim 1 in which the de-correlation rings comprise an upstanding vane which extends around the elongated member.

4. The elongated member as claimed in claim 3 in which the vane is cut away at intervals to form the vortex tripping features.

5. The elongated member as claimed in claim 4 in which the cut aways in the vane are trapezoidal or "U" shaped.

6. The elongated member as claimed in claim 4 in which the depth of the cut aways is at least half of the height of the vane.

7. The elongated member as claimed in claim 3 in which the vane has sides which are inclined at an angle between three and twenty five degrees to a plane normal to the longitudinal axis of the elongate member.

8. The elongated member as claimed in claim 3 in which the de-correlation rings each comprise at least two vanes extending around the member.

9. The elongated member as claimed in claim 8 in which the two vanes are separated by a distance between 0.1 D and 0.5 D, where D is a lateral dimension of the elongate member.

10. The elongated member as claimed in claim 1 in which the vortex tripping features are formed upon a projecting ring.

11. The elongated member as claimed in claim 1 in which the vortex tripping features comprise discrete vanes arranged at intervals around the member.

12. The elongated member as claimed in claim 1 which is substantially circular and in which the vortex tripping features have a radial height between 0.01 D and 0.25 D, where D is a lateral dimension of the elongate member.

13. The elongated member as claimed in claim 1 in which the number of vortex tripping features of each de-correlation ring is from two to seventy two inclusive.

14. The elongated member as claimed in claim 1 in which the number of vortex tripping features of each de-correlation ring is from three to twenty four inclusive.

15. The elongated member as claimed in claim 1 in which the de-correlation rings are formed by a ring structure mounted around the elongate member.

16. The elongate member as claimed in claim 15 in which the de-correlation ring is formed as a clamp.

17. The elongated member as claimed in claim 1 in which vanes defining the vortex tripping features are triangular or trapezoidal in shape.

18. The elongated member as claimed in claim 1, wherein the elongate member is formed as a pipe, marine riser, or buoyancy module.

19. The elongated member as claimed in claim 3 in which the vane is at least 0.03 D.

20. A method of suppressing vortex induced vibration (VIV) of an elongated member deployed underwater, the method comprising providing the elongated member with VIV suppression features comprising multiple de-correlation devices at intervals of between 1 D and 2 D along the elongated member's length, wherein D is a lateral dimension of the elongated member and no fairings are provided between the de-correlation devices, and each de-correlation device comprising multiple vortex tripping features at intervals around the elongated member, thereby disrupting correlation of shed vortices along the elongated member.

21. The method as claimed in claim 20, wherein the elongated member is substantially circular in section, the vortex tripping features being at intervals around the member's circumference.

22. The method as claimed in claim 20, wherein the de-correlation rings comprise an upstanding vane which extends around the elongated member.

23. The method as claimed in claim 22, wherein the vane is cut away at intervals to form the vortex tripping features.

24. The method as claimed in claim 23, wherein the cut aways in the vane are trapezoidal or "U" shaped.

25. The method as claimed in claim 23, wherein the depth of the cut aways is at least half of the height of the vane.

26. The method as claimed in claim 22, wherein the vane has sides which are inclined at an angle between three and twenty five degrees to a plane normal to the longitudinal axis of the elongate member.

27. The method as claimed in claim 22, wherein the de-correlation device comprises at least two vanes extending around the member.

28. The method as claimed in claim 27, wherein the two vanes are separated by a distance between 0.1 D and 0.5 D, where D is a lateral dimension of the elongate member.

29. The method as claimed in claim 20, wherein the vortex tripping features are formed upon a projecting ring.

30. The method as claimed in claim 20, wherein the vortex tripping features comprise discrete vanes arranged at intervals around the member.

31. The method as claimed in claim 20, wherein the elongated member is substantially circular and in which the vortex tripping features have a radial height between 0.01 D and 0.25 D, where D is a lateral dimension of the elongate member.

32. The method as claimed in claim 20, wherein the number of vortex tripping features of the de-correlation device is from two to seventy two inclusive.

33. The method as claimed in claim 20, wherein the number of vortex tripping features of the de-correlation device is from three to twenty four inclusive.

34. The method as claimed in claim 20, wherein the de-correlation devices are formed by a ring structure for mounting around the elongate member.

35. The method as claimed in claim 20, wherein the de-correlation device is formed as a clamp.

36. The method as claimed in claim 20, wherein vanes defining the vortex tripping features are triangular or trapezoidal in shape.

37. The method as claimed in claim 20, wherein the elongate member is formed as a pipe, marine riser, or buoyancy module.

38. The method as claimed in claim 22, wherein the vane is at least 0.03 D.

* * * * *